United States Patent
Emmerich et al.

(10) Patent No.: US 8,913,862 B1
(45) Date of Patent: Dec. 16, 2014

(54) OPTICAL COMMUNICATION CABLE

(71) Applicant: Corning Optical Communications LLC, Hickory, NC (US)

(72) Inventors: Michael Emmerich, Berlin (DE); Warren Welborn McAlpine, Hickory, NC (US); Guenter Wuensch, Neustadt (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/231,875

(22) Filed: Apr. 1, 2014

Related U.S. Application Data

(60) Provisional application No. 61/883,286, filed on Sep. 27, 2013.

(51) Int. Cl.
*G02B 6/44* (2006.01)
(52) U.S. Cl.
CPC .................................. *G02B 6/4429* (2013.01)
USPC ........................................................ 385/103
(58) Field of Classification Search
CPC .. G02B 6/4495; G02B 6/4433; G02B 6/4411; G02B 6/4494
USPC ................... 385/104, 105, 110, 111
See application file for complete search history.

(56) References Cited

U.S. PATENT DOCUMENTS

| | | | | |
|---|---|---|---|---|
| 4,496,214 A | | 1/1985 | Oestreich et al. | 350/96.23 |
| 4,515,435 A | * | 5/1985 | Anderson | 385/103 |
| 4,535,098 A | | 8/1985 | Evani et al. | 521/149 |
| 4,557,558 A | | 12/1985 | Bresser | 350/96.23 |
| 4,723,831 A | | 2/1988 | Johnson et al. | 350/96.23 |
| 4,730,894 A | | 3/1988 | Arroyo | 350/96.23 |
| 4,740,053 A | * | 4/1988 | Cassidy | 385/102 |
| 4,767,184 A | | 8/1988 | Ogasawara et al. | 350/96.23 |
| 4,796,970 A | | 1/1989 | Reeve et al. | 385/109 |
| 4,930,860 A | * | 6/1990 | Tansey et al. | 385/106 |
| 4,973,611 A | | 11/1990 | Puder | 522/42 |
| 4,993,804 A | | 2/1991 | Mayr et al. | 350/96.23 |

(Continued)

FOREIGN PATENT DOCUMENTS

| | | | | |
|---|---|---|---|---|
| CN | 102023357 B | | 11/2012 | G02B 6/44 |
| EP | 1531352 B1 | | 12/2009 | G02B 6/44 |
| EP | 1610163 B1 | | 10/2011 | G02B 6/44 |
| EP | 1982222 B1 | | 6/2012 | G02B 6/44 |
| GB | 2064163 A | * | 6/1981 | G02B 5/14 |

(Continued)

OTHER PUBLICATIONS

Hogari et al., Feb. 1998, "Optical Fiber Cables for Residential and Business Premises," Journal of Lightwave Technology, vol. 16, No. 2, pp. 207-213.

(Continued)

*Primary Examiner* — Charlie Peng

(57) ABSTRACT

An optical communication cable is provided. The cable includes a plurality of elongate optical transmission elements wrapped around an elongate central strength member such that a portion of the length of the plurality of wrapped elongate optical transmission elements form a spiral portion around the elongate central strength member. The cable includes an elastic sleeve surrounding the plurality of elongate optical transmission elements, and the elastic sleeve is formed from an extruded first material. The cable includes a cable body formed from an extruded second material different from the first material, and the cable body surrounds the film, and the cable body has an inner surface that faces the outer surface of the film.

30 Claims, 8 Drawing Sheets

(56) References Cited

U.S. PATENT DOCUMENTS

| | | | |
|---|---|---|---|
| 5,155,789 A | 10/1992 | Le Noane et al. | 385/106 |
| 5,157,752 A | 10/1992 | Greveling et al. | 385/112 |
| 5,173,961 A | 12/1992 | Chiasson | 385/113 |
| 5,179,611 A | 1/1993 | Umeda et al. | 385/110 |
| 5,233,678 A | 8/1993 | Katurashima et al. | 385/112 |
| 5,388,175 A | 2/1995 | Clarke | 385/100 |
| 5,440,660 A | 8/1995 | Dombrowski et al. | 385/102 |
| 5,671,312 A | 9/1997 | Jamet | 385/100 |
| 5,684,904 A | 11/1997 | Bringuier et al. | 385/109 |
| 5,703,983 A * | 12/1997 | Beasley, Jr. | 385/104 |
| 6,137,936 A | 10/2000 | Fitz et al. | 385/113 |
| 6,185,352 B1 | 2/2001 | Hurley | 385/114 |
| 6,193,824 B1 | 2/2001 | Einsle et al. | 156/53 |
| 6,215,931 B1 | 4/2001 | Risch et al. | 385/109 |
| 6,304,701 B1 | 10/2001 | Bringuier et al. | 385/106 |
| 6,314,713 B1 | 11/2001 | Fitz et al. | 57/293 |
| 6,318,061 B1 | 11/2001 | Schneider et al. | 57/7 |
| 6,334,015 B2 | 12/2001 | Jamet | 385/102 |
| 6,483,971 B2 | 11/2002 | Gaillard et al. | 385/113 |
| 6,487,346 B2 | 11/2002 | Nothofer | 385/109 |
| 6,546,712 B2 | 4/2003 | Moss et al. | 57/293 |
| 6,597,844 B1 | 7/2003 | Witt et al. | 385/109 |
| 6,603,908 B2 | 8/2003 | Dallas et al. | 385/109 |
| 6,658,184 B2 | 12/2003 | Bourget et al. | 385/100 |
| 6,721,480 B1 | 4/2004 | Bocanegra et al. | 385/114 |
| 6,760,523 B2 | 7/2004 | V. Nechitailo | 385/112 |
| 6,798,958 B2 | 9/2004 | Bourget et al. | 385/113 |
| 6,856,748 B1 | 2/2005 | Elkins, II et al. | 385/135 |
| 6,870,995 B2 | 3/2005 | Johnson et al. | 385/112 |
| 6,901,191 B2 | 5/2005 | Hurley et al. | 385/109 |
| 6,912,347 B2 | 6/2005 | Rossi et al. | 385/112 |
| 6,931,190 B2 | 8/2005 | Ino et al. | 385/128 |
| 6,937,802 B2 | 8/2005 | Jamet et al. | 385/106 |
| 6,957,000 B2 | 10/2005 | McAlpine et al. | 385/102 |
| 6,973,246 B2 | 12/2005 | Bocanegra et al. | 385/113 |
| 7,082,241 B2 | 7/2006 | Jamet et al. | 385/109 |
| 7,123,801 B2 | 10/2006 | Fitz | 385/105 |
| 7,200,307 B2 | 4/2007 | Bau' et al. | 385/111 |
| 7,212,715 B2 | 5/2007 | Dallas et | 385/100 |
| 7,242,830 B2 | 7/2007 | Storaasli et al. | 385/100 |
| 7,242,831 B2 | 7/2007 | Fee | 385/103 |
| 7,321,709 B2 | 1/2008 | Yokokawa et al. | 385/103 |
| 7,359,600 B2 | 4/2008 | Kim et al. | 385/113 |
| 7,373,057 B2 | 5/2008 | Pizzorno et al. | 385/109 |
| 7,391,943 B2 | 6/2008 | Blazer et al. | 385/109 |
| 7,431,963 B2 | 10/2008 | Konstadinidis et al. | 427/163.2 |
| 7,567,741 B2 | 7/2009 | Abernathy et al. | 385/113 |
| 7,570,852 B2 | 8/2009 | Nothofer et al. | 385/100 |
| 7,570,854 B2 | 8/2009 | Keller et al. | 385/110 |
| 7,630,605 B2 | 12/2009 | Bringuier et al. | 385/109 |
| 7,742,667 B2 | 6/2010 | Paschal et al. | 385/109 |
| 7,750,060 B2 | 7/2010 | Zahora et al. | 522/97 |
| 7,970,247 B2 | 6/2011 | Barker | 385/100 |
| 7,974,507 B2 | 7/2011 | Lovie et al. | 385/113 |
| 7,995,886 B2 | 8/2011 | Pizzorno et al. | 385/109 |
| 8,031,997 B2 | 10/2011 | Overton | 385/110 |
| 8,041,167 B2 | 10/2011 | Overton | 385/109 |
| 8,118,282 B2 | 2/2012 | Griffioen et al. | 254/134.4 |
| 8,165,439 B2 | 4/2012 | Overton | 385/106 |
| 8,175,434 B2 | 5/2012 | Davidson et al. | 385/113 |
| 8,180,190 B2 | 5/2012 | Bringuier et al. | 385/109 |
| 8,189,974 B2 | 5/2012 | Hashimoto et al. | 385/109 |
| 8,306,377 B2 | 11/2012 | Keller et al. | 385/109 |
| 8,355,613 B2 | 1/2013 | Weimann | 385/100 |
| 8,467,645 B2 | 6/2013 | Keller et al. | 385/104 |
| 8,467,650 B2 | 6/2013 | Overton et al. | 385/128 |
| 8,494,327 B2 | 7/2013 | Keller et al. | 385/106 |
| 8,498,509 B2 | 7/2013 | Tatat | 385/109 |
| 2003/0035635 A1 * | 2/2003 | Chastain et al. | 385/112 |
| 2003/0165310 A1 | 9/2003 | Moon et al. | 385/113 |
| 2004/0240806 A1 | 12/2004 | Lail et al. | 385/100 |
| 2004/0252954 A1 * | 12/2004 | Ginocchio et al. | 385/100 |
| 2005/0013573 A1 | 1/2005 | Lochkovic et al. | 385/128 |
| 2006/0045443 A1 | 3/2006 | Blazer | 385/114 |
| 2006/0093268 A1 | 5/2006 | Zimmel | 385/50 |
| 2006/0193575 A1 | 8/2006 | Greenwood et al. | 385/109 |
| 2008/0273845 A1 | 11/2008 | Weimann | 385/103 |
| 2008/0279515 A1 | 11/2008 | Bickham et al. | 385/123 |
| 2009/0116797 A1 | 5/2009 | Stingl et al. | 385/103 |
| 2009/0214167 A1 | 8/2009 | Lookadoo et al. | 385/100 |
| 2009/0297104 A1 | 12/2009 | Kachmar | 385/101 |
| 2009/0317039 A1 | 12/2009 | Blazer et al. | 385/107 |
| 2010/0067856 A1 | 3/2010 | Knoch et al. | 385/111 |
| 2010/0119202 A1 | 5/2010 | Overton | 385/141 |
| 2010/0150505 A1 | 6/2010 | Testu et al. | 385/109 |
| 2010/0189399 A1 | 7/2010 | Sillard et al. | 385/126 |
| 2010/0202741 A1 | 8/2010 | Ryan et al. | 385/113 |
| 2011/0091171 A1 | 4/2011 | Tatat et al. | 385/105 |
| 2011/0110635 A1 | 5/2011 | Toge et al. | 385/102 |
| 2011/0135816 A1 | 6/2011 | Burns et al. | 427/163.2 |
| 2011/0194825 A1 | 8/2011 | Parris | 385/109 |
| 2011/0268398 A1 | 11/2011 | Quinn et al. | 385/100 |
| 2011/0286706 A1 * | 11/2011 | Greenwood et al. | 385/107 |
| 2012/0063731 A1 | 3/2012 | Fitz et al. | 385/104 |
| 2012/0099825 A1 | 4/2012 | Messer | 385/113 |
| 2012/0257864 A1 | 10/2012 | Consonni et al. | 385/112 |
| 2012/0281953 A1 | 11/2012 | Choi et al. | 385/101 |
| 2013/0058614 A1 | 3/2013 | Gimblet et al. | 385/104 |

FOREIGN PATENT DOCUMENTS

| | | | |
|---|---|---|---|
| GB | 2096343 A | 10/1982 | G02B 5/14 |
| JP | 3137607 | 11/2007 | A61B 6/00 |
| JP | 2010-39018 | 2/2010 | G02B 6/44 |
| KR | 10-0288444 | 5/2001 | G02B 6/44 |
| KR | 2001-0045604 | 6/2001 | G02B 6/44 |
| KR | 10-1140219 B1 | 5/2012 | G02B 6/44 |
| WO | WO 01/21706 A1 | 3/2001 | C08L 23/06 |
| WO | WO 02/099491 A1 | 12/2002 | G02B 6/44 |
| WO | WO 2006/034722 A1 | 4/2006 | G02B 6/44 |
| WO | WO 2011/137236 A1 | 11/2011 | B29C 47/02 |
| WO | WO 2012/071490 A2 | 5/2012 | B29C 47/02 |
| WO | WO 2012/071490 A3 | 5/2012 | B29C 47/02 |
| WO | WO 2013/130121 A1 | 9/2013 | G02B 6/44 |
| WO | WO 2013/172878 A1 | 11/2013 | G02B 6/44 |

OTHER PUBLICATIONS

Marelli et al., Nov. 11-14, 2007, "Indoor Cables for FTTH Applications, Allowing Quick and Simple Subscriber Connection," 56th IWCS Conference: Proceedings of the International Wire & Cable Symposium (IWCS), Inc., pp. 121-127.

Prysmian Cables & Systems, Oct. 5, 2005, "Glossary Excerpt from Prysmian's Wire and Cable Engineering Guide," Revision 3, pp. 1-40, Retrieved from www.prysmian.com.

Patent Cooperation Treaty Annex to Form PCT/ISA/206, Communication Relating to the Results of the Partial International Search, Application No. PCT/US2013/061133, Jan. 8, 2014, 3 pages.

USPTO, Non-Final Rejection for U.S. Appl. No. 13/790,329, Mailing Date Aug. 16, 2013—12 pages.

Non-Final Rejection Response for U.S. Appl. No. 13/790,329, Mailing Date Oct. 11, 2013—20 pages.

USPTO, Notice of Allowance for U.S. Appl. No. 13/790,329, Mailing Date Nov. 12, 2013—8 pages.

USPTO, Non-Final Rejection for U.S. Appl. No. 14/091,548, Mailing Date Jan. 29, 2014—17 pages.

Non-Final Rejection Response for U.S. Appl. No. 14/091,548, Mailing Date Mar. 7, 2014—15 pages.

USPTO, Notice of Allowance for U.S. Appl. No. 14/091,548, Mailing Date Apr. 3, 2014—12 pages.

Nextrom, "SZ Stranding Line OFC 70," Retrieved on Mar. 31, 2014 from http://www.nextrom.com/877__en__SZ-Stranding-Line.aspx.

Marik, J., "Advanced SZ Stranding Technology for Enhanced Applications," Retrieved on Mar. 31, 2014 from http://www.rosendahlaustria.com/custom/rosendahlaustria/Rosendahl__Products__PDF/1062003111324__p1__.pdf.

Rechberger, M. & Hörschläger, W., "Buffering & SZ-Stranding Process for Compact Dry Tube FO-Cable," Proceedings of the 56th International Wire & Cable Symposium, 2007, Retrieved on Mar. 31, 2014 from http://ecadigitallibrary.com/pdf/IWCS07/15__5.pdf.

* cited by examiner

OPTICAL COMMUNICATION CABLE

RELATED APPLICATIONS

This Application claims the benefit of U.S. Provisional Application No. 61/883,286, filed Sep. 27, 2013, which is incorporated by reference herein in its entirety.

BACKGROUND

The disclosure relates generally to optical communication cables and more particularly to optical communication cables including core elements that are coupled together by a thin film prior jacket extrusion. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable. The optical communication cable includes a cable body, a first core element located in the cable body and a second core element located in the cable body. The first core element includes a first tube having an inner surface defining a bore and an outer surface and a first optical transmission element located within the bore of the first tube. The second core element includes a second tube having an inner surface defining a bore and an outer surface and a second optical transmission element located within the bore of the second tube. The optical communication cable includes a strength member located in the cable body. The first core element and the second core element are wound around the strength member. The optical communication cable includes an elastic sleeve formed from an extruded first material, and the elastic sleeve surrounds the first core element, the second core element and the strength member. The elastic sleeve includes an inner surface facing the outer surface of the first core element and the outer surface of the second core element. The cable body is formed from an extruded second material. The cable body surrounds the elastic sleeve, and the cable body has an inner surface that faces an outer surface of the elastic sleeve.

An additional embodiment of the disclosure relates to an optical communication cable. The optical communication cable includes a cable body having a passage within the cable body. The optical communication cable includes a first core element located in the passage of the cable body, and the first core element includes an outer surface and a first optical transmission element. The optical communication cable includes a second core element located in the passage of the cable body, and the second core element includes an outer surface and a second optical transmission element. The optical communication cable includes a strength member located in the passage of the cable body, and the first core element and the second core element are wound around the strength member. The optical communication cable includes a film formed from an extruded first material located within the passage of the cable body. The film surrounds the first core element, the second core element and the strength member. The film applies a radial inwardly directed force to the outer surface of the first core element and the outer surface of the second core element. The cable body is formed from a second material different from the first material. The cable body surrounds the film, and the cable body has an inner surface that faces the outer surface of the film.

An additional embodiment of the disclosure relates to an optical communication cable. The optical communication cable includes a cable body having a bore within the cable body. The optical communication cable includes an elongate central strength member located in a central area of the bore. The optical communication cable includes a plurality of elongate optical transmission elements wrapped around the elongate central strength member such that a portion of a length of the plurality of wrapped elongate optical transmission elements forms a spiral portion around the elongate central strength member. The optical communication cable includes an extruded membrane surrounding the plurality of elongate optical transmission elements. The extruded membrane is formed from a first material, and the extruded membrane is contiguous in a circumferential direction around the elongate optical transmission elements and is contiguous in an axial direction for at least one revolution of the elongate optical transmission elements around the elongate central strength member within the spiral portion. The membrane contacts an outer surface of each of the plurality of elongate optical transmission elements within the spiral portion. The cable body is formed from an extruded second material. The cable body surrounds the film, and the cable body has an inner surface that faces the outer surface of the film.

An additional embodiment of the disclosure relates to an optical communication bundle. The optical communication bundle includes an elongate central strength member and a plurality of elongate optical transmission elements wrapped around the elongate central strength member such that a portion of the length of the plurality of wrapped elongate optical transmission elements form a spiral portion around the elongate central strength member. The optical communication bundle includes an extruded membrane surrounding the plurality of elongate optical transmission elements. The extruded membrane is contiguous in the circumferential direction around the elongate optical transmission elements and is contiguous in an axial direction for at least five revolutions of the elongate optical transmission elements around the central strength member. The extruded membrane applies a radial inwardly directed force to the outer surfaces of the plurality of elongate optical transmission elements such that the film acts to maintain the spiral arrangement of the spiral portion of the wrapped elongate optical transmission elements Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include a thin film or membrane layer that surrounds and binds together the core elements of the cable (e.g., buffer tubes containing loose optical fibers, optical micro-modules, tight buffered optical fibers, filler rods, etc.). The film discussed herein is extruded over the core elements after the core elements are wound in a pattern or arrangement (e.g., a spiral pattern, a helical pattern, SZ pattern, etc.) around a central support member. The film is rapidly cooled and solidified around the core element such that the film contracts applying a radially inwardly directed force onto the core elements. The radial inwardly directed force increases the normal force between the core elements and the central strength element which acts to limit or prevent relative movement between the core elements and the central strength element as the elements are advanced through the cable assembly process. In addition, the radial force provided by the film acts to maintain the core elements in the wound pattern by preventing or limiting the core elements from unwinding from around the central strength member. In particular, this restraining force provided by the film maintains the core elements in the desired wound pattern as the additional components (e.g., armor material, cable jackets, etc.) are applied to form the completed cable. Thus, in various embodiments the film is an elastic sleeve that forms an interference fit with the core elements of the cable.

In various embodiments, the optical cables discussed herein include optical fiber micromodules that have low or zero extra fiber length (EFL, such as less than an average of about 0.1% or less per fiber per micromodule) within the buffer tube of the micromodules. In addition, such micromodules may include densely packed optical fibers within a buffer tube in which the inner surface of the buffer tube contacts the outer surface of one or more optical fibers within the buffer tube. The dense packing of optical fibers within the micromodules allows for smaller cross-sectional area optical units. However, the lack of EFL and the tight packing may also act to transfer external forces to the optical fibers which may result in optical signal attention. In contrast to helically wound binder fibers that create localized pressure points at the point of contact between the helical binder and the buffer tube, the film binder discussed herein distributes the binding forces evenly around both the circumference of the core elements and axially along the length of the core elements. In the case of micromodules that may be more susceptible to strain based attenuation, the thin film binders discussed herein may act to limit or prevent such strain based attenuation.

Figure 1:
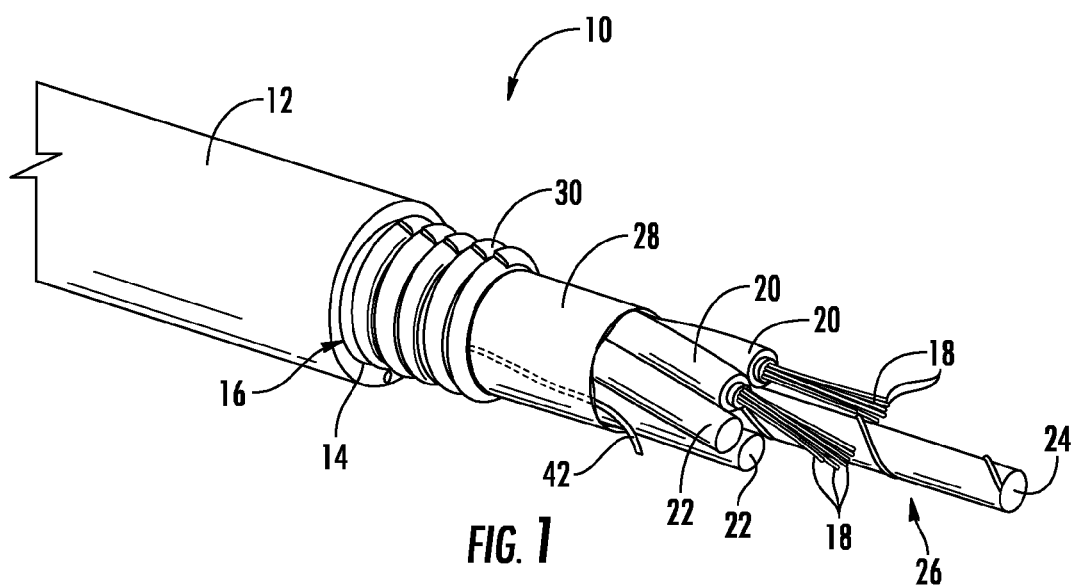
FIG. 1 is a perspective view of an optical fiber cable according to an exemplary embodiment.

Referring to FIG. 1, an optical communication cable, shown as cable 10, is shown according to an exemplary embodiment. Cable 10 includes a cable body, shown as cable jacket 12, having an inner surface 14 that defines a inner passage or cavity, shown as central bore 16. As will be generally understood, inner surface 14 of jacket 12 defines an internal area or region within which the various cable components discussed below are located. A plurality of optical transmission elements, shown as optical fibers 18, are located within bore 16. Generally, cable 10 provides structure and protection to optical fibers 18 during and after installation (e.g., protection during handling, protection from elements, protection from vermin, etc.).

In the embodiment shown in FIG. 1, cable 10 includes a plurality of core elements located within central bore 16. A first type of core element is an optical transmission core element, and these core elements include bundles of optical fibers 18 that are located within tubes, such as buffer tubes 20. One or more additional core elements, shown as filler rods 22, may also be located within bore 16. Filler rods 22 and buffer tubes 20 are arranged around a central support, shown as central strength member 24 formed from a material such as glass-reinforced plastic or metal (e.g., steel). Together, buffer tubes 20 containing optical fibers 18, filler rods 22 and central strength member 24 form the core 26 of cable 10.

Cable 10 includes a film or membrane, shown as binding film 28, located around buffer tubes 20 and filler rods 22 of cable 10. As explained in more detail below, thin film 28 is an extruded thin film that cools to provide an inwardly directed force on to buffer tubes 20 and filler rods 22. The inwardly directed force provided by film 28 assists to hold buffer tubes 20 and filler rods 22 in a fixed position relative to central strength member 24 by increasing the normal force and therefore frictional force between these components. Thus, in some embodiments, an interference fit is provided between the outer surfaces of the core elements and film 28 such that film 28 acts to provide an inwardly directed force onto the core elements of cable 10. In addition, the inwardly directed force provided by film 28 acts to prevent/resist unraveling of the wound core elements. In some embodiments, an adhesive (e.g., hot melt adhesive) is applied to couple core elements such as buffer tubes 20 and filler rods 22 to strength member 24. Thus, in various embodiments, the film of cable 10 is a constraining element or constraining sleeve that acts to bind together the core of cable 10 as discussed herein. In specific embodiments, the film of cable 10 is an elastic sleeve that applies a radial inwardly directed force as discussed herein.

In various embodiments, film 28 is formed from a first material, and jacket 12 is formed from a second material. In various embodiments, the first material is different from the second material. In some such embodiments, the material type of the first material is different from the material type of the second material. In various embodiments, film 28 may be formed from a variety of extruded polymer materials. In various embodiments, film 28 may be formed from low-density polyethylene (LDPE), polyester, or polypropylene. In one embodiment, film 28 is formed from a linear LDPE. In one embodiment, film 28 is formed from an LDPE material having a modulus of elasticity between 600 MPa and 1000 MPa, and more specifically about 800 MPa (e.g., 800 MPa plus or minus 5 percent). In one embodiment, film 28 is formed from a polyester material having a modulus of elasticity between 2000 MPa and 2800 MPa, and more specifically about 2400 MPa (e.g., 2400 MPa plus or minus 5 percent). In various embodiments, the material of film 28 may include a coloring material. In one such embodiment, film 28 may be colored the same as jacket 12. In one such embodiment, the material of film 28 may be a polymer material (e.g., LDPE, PP) including carbon black coloring material, and the different material of jacket 12 may be a different polymer material (e.g., medium density polyethylene) that also includes carbon black coloring material. In addition, film 28 may include UV stabilizing compounds and may include weakened areas (e.g., lower thickness areas) that facilitate tearing, for example via rip cord 42.

As noted above, the first material of film 28 is different from the second material of jacket 12. In some such embodiments, film 28 is formed from a first material that is extruded at an earlier time or earlier stage in cable production than jacket 12. In such embodiments, film 28 is formed prior to formation of jacket 12. In some such embodiments, a first extrusion process forms film 28 at an earlier time in cable production, and a second extrusion process forms jacket 12 at a later time in cable production. In some such embodiments, the first material of film 28 and the second material of jacket 12 are the same type of material (e.g., both are MDPE, PP, etc.) that are associated with cable 10 at different time points during production of cable 10. In other embodiments, the first material of film 28 and the second material of jacket 12 are the different types of material (e.g., film 28 is a LDPE and jacket 12 is MDPE) and are also associated with cable 10 at different time points during production of cable 10.

In contrast to a cable that includes a single outer extruded layer (e.g., a single extruded jacket), cables discussed herein including two extruded layers may include various structures not present in a cable having a single extruded layer (e.g., a single extruded outer jacket layer). For example, in some embodiments, film 28 includes an outer surface 41 that interfaces with inner surface 14 of jacket 12. In some embodiments, cable 10 may include gaps, air pockets or delaminations between jacket 12 and film 28. In embodiments in which the material of film 28 and jacket 12 melt or bond together during jacket extrusion, there may be a region of mixed material including a mixture of both the material of film 28 and the material of jacket 12. In some such embodiments, within the region of mixed material, the density of the material of film 28 increases in the radially inward direction, and the density of the material of jacket 12 increases in the radially outward direction.

In various embodiments, a layer of powder, such as water absorbing powder or particles, such as super absorbent polymer (SAP) or a water swellable gel or liquid, is located within bore 16. In such embodiments, the inner surface of film 28 includes the water absorbent particles or other material that that directly contacts the outer surfaces of buffer tubes 20 and filler rods 22 under the radial inwardly directed force applied by film 28. In other words, as discussed herein, contact between film 28 and buffer tubes 20 and filler rods 22 may include contact through certain discontinuous intermediate or filler materials that may be present within bore 16, such as SAP particles, SAP yarns and/or water swellable gels and liquids, that may be positioned within bore 16. However, as discussed herein, contact between film 28 and buffer tubes 20 and filler rods 22 does not include contact through a circumferentially continuous layer of material located between film 28 and buffer tubes 20. In some embodiments, the inner surface of film 28 directly contacts the outer surface of buffer tubes 20 such at least a portion of the inner surface of film 28 directly physically interacts with the outer surface of the buffer tube 20 without intervening material. In one embodiment, the water blocking gel has a low gel viscosity, for example lower than 4000 mPas. In one embodiment, the SAP material may have an average polymer particle size between 5 micrometers and 20 micrometers.

In some embodiments, cable 10 includes a reinforcement sheet or layer, shown as armor layer 30, that is located outside of film 28. Armor layer 30 is wrapped around the interior elements (including optical fibers 18) of cable 10 such that armor layer 30 surrounds optical fibers 18. Armor layer 30 generally provides an additional layer of protection to fibers 18 within cable 10, and may provide resistance against damage (e.g., damage caused by contact or compression during installation, damage from the elements, damage from rodents, etc.).

Figure 2:
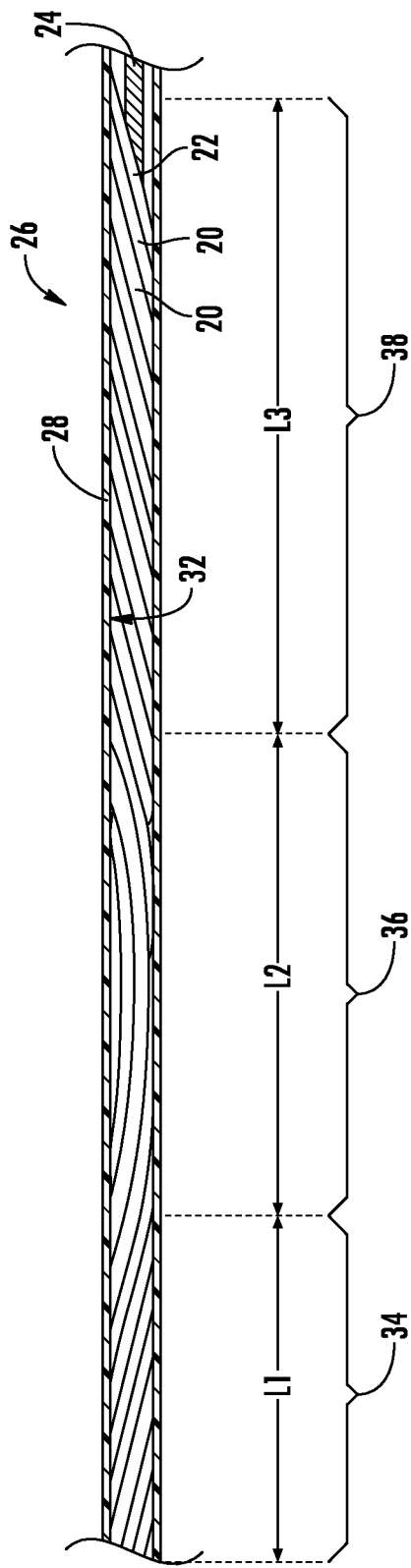
FIG. 2 is a detailed side view showing wrapped core elements of the cable of FIG. 1 bound together via a film according to an exemplary embodiment.

Referring to FIG. 2, optical core 26 is shown with film 28 in cross-section to show the wrap or winding pattern of buffer tubes 20 and filler rods 22 around central strength member 24. As shown in FIG. 2, film 28 includes an inner surface 32 that extends in the axial direction shown in FIG. 2 (i.e., left and right in the orientation of FIG. 2) and is in contact with the radially exterior portions of the outer surfaces of buffer tubes 20 and filler rods 22 in the axial direction.

In FIG. 2, optical core 26 is shown having at least one spiral wrapped section. Specifically, optical core 26 is shown in an SZ wrapped pattern (also referred to as an SZ stranding pattern). In such embodiments, optical core 26 includes a right-handed spirally wrapped section 34, a reversal section 36 and a left-handed spirally section 38. Within right-handed spirally wrapped section 34, the core elements, such as buffer tubes 20 and filler rods 22, are wrapped spirally in the right-handed direction. Within left-handed spirally wrapped section 38, the core elements, such as buffer tubes 20 and filler rods 22, are wrapped spirally in the left-handed direction. Reversal section 36 is a section that provides the transition between the right-handed spirally wrapped section 34 and the left-handed spirally wrapped section 38. In one embodiment, reversal section 36 is shaped as a sinusoidal function.

It should be understood that while FIG. 2 shows one right-handed spirally wrapped section, one reversal section and one left-handed spirally wrapped section, optical core 26 may include a large number of repeating sections similar to the sections shown in FIG. 2. In various embodiments, the right-handed spirally wrapped sections and left-handed spirally wrapped sections alternate along the length of optical core 26 with reversal sections located between each oppositely wrapped spiral section.

In addition, spirally wrapped sections include a pitch length (also known as lay length) which is the axial distance required for one of the core elements to complete a full revolution around strength member 24. In some embodiments, core 26 may have an average pitch length (or average lay length) which is the average of the multiple individual pitch lengths along the length of core 26. In various embodiments, each of sections 34, 36 and 38 have axial lengths shown as L1, L2 and L3, respectively. Generally, L1 is the length of right-handed spirally wrapped section 34 and is the distance between the reversal sections at the beginning and end of right-handed spirally wrapped section 34. L3 is the length of left-handed spirally wrapped section 38 and is the distance between the reversal sections at the beginning and end of left-handed spirally wrapped section 38. L2 is the length of reversal section 36 and generally is the distance between the beginning point and the end point of section 36. In general, the beginning point of section 36 is the point at which the pitch of right-handed spirally wrapped section 34 starts to change following section 34 moving in a direction from left to right in the orientation of FIG. 2, and the end point of section 36 is the point at which the pitch of left-handed spirally wrapped section 38 starts to change following section 38 moving in a direction from right to left in the orientation of FIG. 2.

In various embodiments, L1 and L3 are expressed in terms of the number pitch lengths that reside in the section. In other words, L1 and L3 may be expressed in terms of the number of revolutions of the core elements that are contained within each section. In various embodiments, L1 and L3 are less than 10 revolutions and more than one half revolution (i.e., less than 10 pitch lengths or lay lengths and more than one half pitch length or lay lengths). In various embodiments, L1 and L3 are between 1 revolution and 1.5 revolutions. In other embodiments, L1 and L3 are 7 revolutions, and in another embodiment, L1 and L3 are between 1 and 2 revolutions. In some embodiments, L1 and L3 are substantially the same for each right-handed spirally wrapped section 34 and each left-handed spirally wrapped section 38, respectively, along the length core 26. In other embodiments, the frequency or position of reversal 36 varies along the axis of core 26, such that L1 and L3 are different at different axial positions along core 26. In such embodiments, core 26 may have an average pitch length for the right-handed spirally wrapped section 34 and for the left-handed spirally wrapped section 38, which is the average of all pitch lengths along the length of core 26 with in each section. In various embodiments, L2 of reversal section 36 is between 45 mm and 100 mm.

Figure 8:
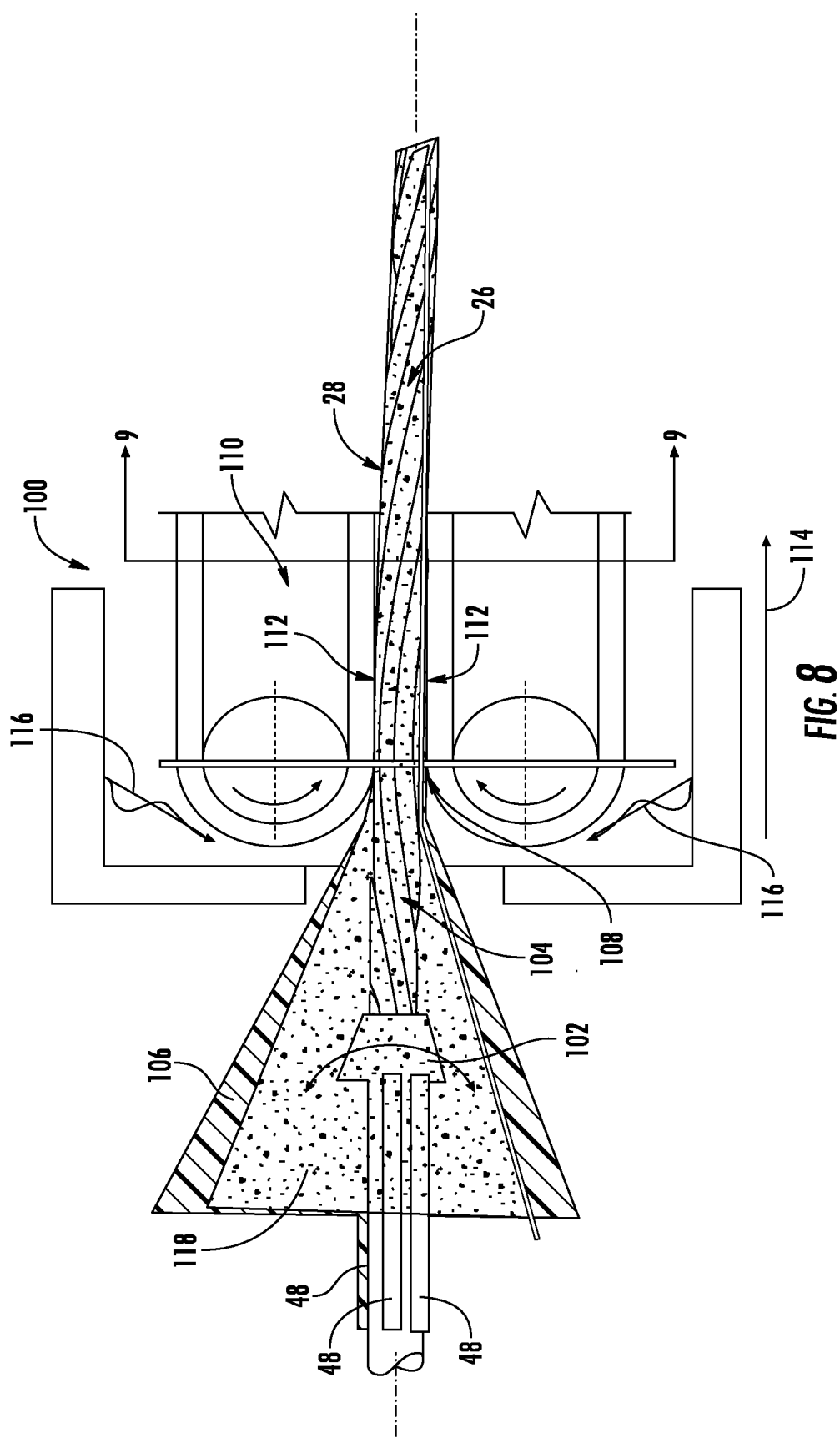
FIG. 8 is a schematic view showing a system and process for forming an optical cable having a thin film binder according to an exemplary embodiment.

In various embodiments, film 28 is positioned relative to the wrapped pattern of core 26 to restrain the core 26 from unwinding or unwrapping during cable construction. For example, in one embodiment (as shown in FIG. 8), film 28 is applied to the outer surface of core 26 immediately after the core elements are wrapped around central strength member 24 in the desired pattern. In this arrangement, film 28 holds the wrapped core 26 in the desired wrapped pattern as additional cable components (e.g., armor 30, and/or jacket 12) are applied over core 26. In another embodiment, core 26 is an optical communication bundle in which the outer surface of film 28 defines the outermost surface of the communication bundle. In such embodiments, core 26 does not include outer layers such as jacket 12.

Referring to FIG. 2, in various embodiments, film 28 is configured to provide substantially continuous contact with a portion of the outer surface of each of the core elements of core 26 for at least one pitch length within right-handed spirally wrapped section 34 and/or left-handed spirally wrapped section 38. In other embodiments, film 28 is configured to provide substantially continuous contact with a portion of the outer surface of each of the core elements of core 26 for at least five pitch lengths within right-handed spirally wrapped section 34 and/or left-handed spirally wrapped section 38.

In another embodiment, film 28 is configured to provide substantially continuous contact with a portion of the outer surface of each of the core elements of core 26 extending over at least one right-handed spirally wrapped section 34, at least one left-handed spirally wrapped section 38 and over the intervening reversal sections 36. In one such specific embodiment, film 28 is configured to provide substantially continuous contact with a portion of the outer surface of each of the elements of core 26 extending over at least ten right-handed spirally wrapped section 34, at least ten left-handed spirally wrapped section 38 and over the intervening reversal sections 36. In various embodiments, film 28 is configured to impart a radial inwardly directed force over reversal sections 36 causing inner surfaces of each of the core elements within the reversal section to engage the central strength member 24. This force may act to limit axial sliding of the core elements relative to strength member 24 during manufacture. It should be understood that contact between film 28 and the outer surfaces of core 26 includes direct contact between the inner surface 32 of film 28 and the outer surfaces of core 26, indirect contact in which particulate, gel or liquid material (such as water blocking/absorbent materials) are interspersed between core 26 and film 28, or generally any arrangement that allows the radially inwardly directed force generated by the contractive forces of film 28 to be applied to core 26.

Figure 3:
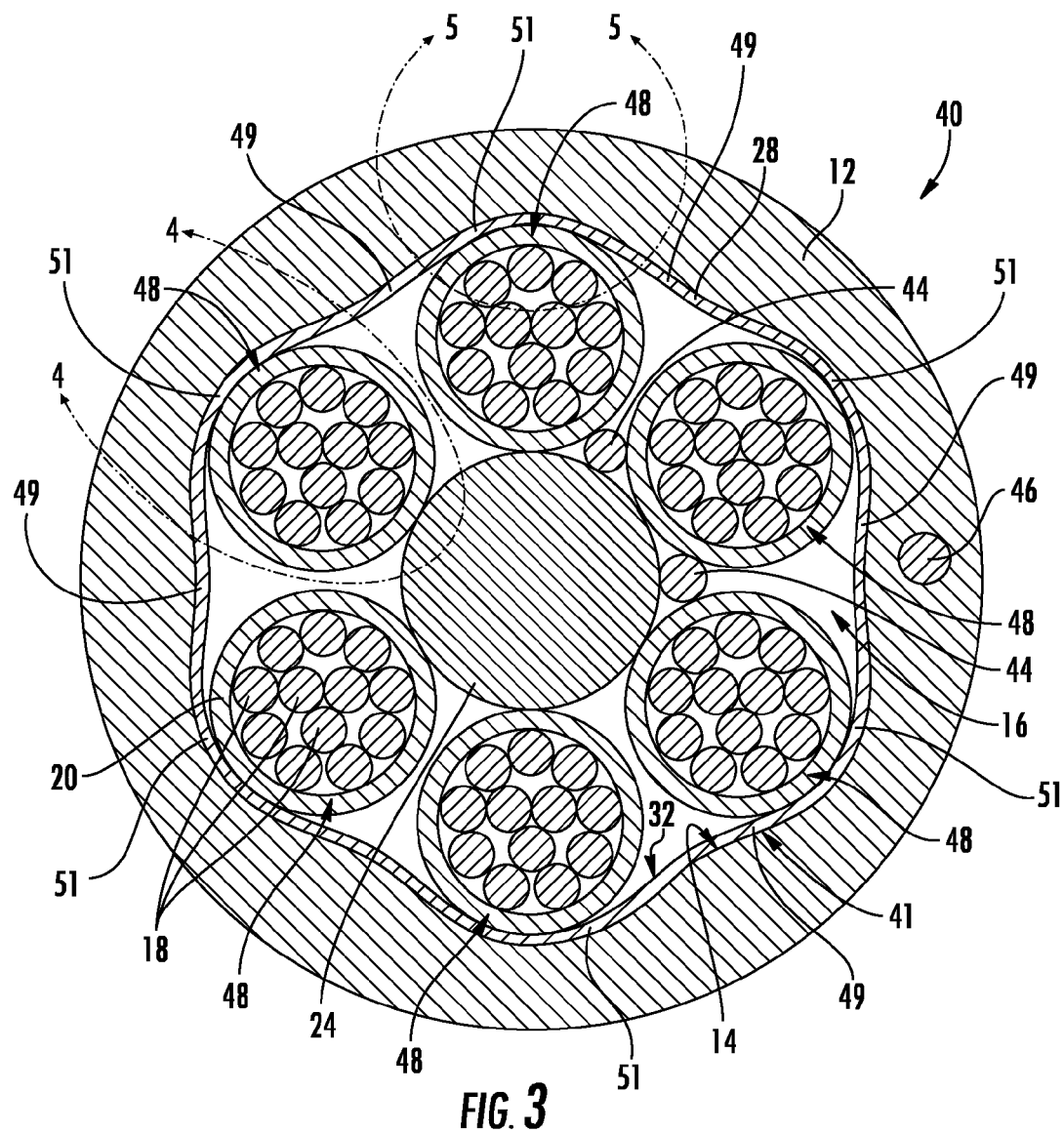
FIG. 3 is a cross-sectional view of a cable according to an exemplary embodiment.

Referring to FIG. 3, a cable 40 is shown according to an exemplary embodiment. Cable 40 is similar to cable 10 except as discussed herein. Cable 40 is shown without armor layer 30, according to an exemplary embodiment. As shown in FIG. 3, inner surface 14 of jacket 12 faces outer surface 41 of film 28. In one embodiment, as shown in FIG. 3, inner surface 14 of jacket 12 faces and directly contacts outer surface 41 of film 28. As used herein one component that directly contacts another component directly physically interacts with the component without intervening layers of material or gaps of air/space. As used herein, one component or surface that faces another component or surface is aligned with or pointed toward the component or surface and may or may not include intervening layers of material or gaps of air/space.

In various embodiments, jacket 12 is made from an extruded polymer material that is different from the extruded polymer material that forms film 28. In one such embodiment, jacket 12 is made from an extruded medium density polyethylene material, and film 28 is formed from an extruded low density polyethylene material. In one such embodiment, when the heated material of jacket 12 contacts the cooled material of film 28 during jacket extrusion, the two materials tend to melt together bonding the material of jacket 12 to film 28. In such embodiments, jacket 12 and film 28 are bonded together such that opening or removal of jacket 12 (e.g., via a rip cord) also opens or removes film 28. In other embodiments, inner surface 14 of jacket 12 faces but does not directly contact outer surface 41 of film 28, and in such embodiments, a layer, such as armor 30 is located between jacket 12 and film 28.

Figure 4:
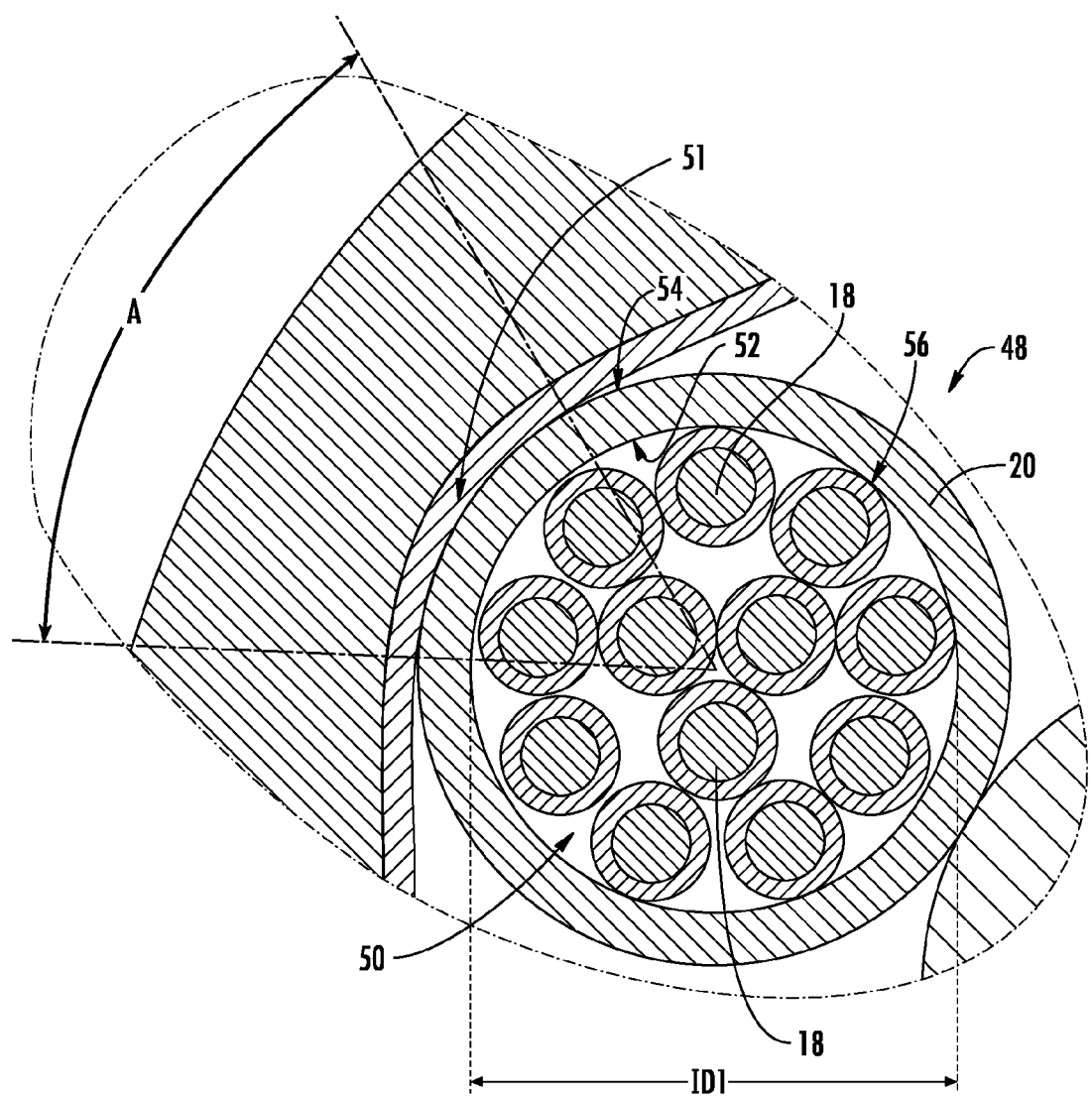
FIG. 4 is a detailed sectional view of a core element of the cable of FIG. 3 according to an exemplary embodiment.

In various embodiments, as film 28 cools, film 28 contracts such that film 28 is in tension around buffer tubes 20 of core elements 48. In the embodiment shown, film 28 forms an undulating pattern of interspersed convex portions 49 and concave portions 51 resulting from the tension generated as film 28 cools and/or vacuum applied to the interior of film 28 during extrusion and cooling. In various embodiments, concave portions 51 of film 28 engages a portion of the outer circumference of each buffer tube 20. As shown in FIG. 4, the portion of the outer surface of buffer tube 20 engaged by concave portions 51 can be defined by angle A. In various embodiments, angle A is between 10 degrees and 90 degrees, specifically is between 20 degrees and 80 degrees and more specifically is between 30 degrees and 70 degrees. In various embodiments, angle A is greater than 10 degrees and less than 360 degrees. In addition, because of the axially continuous and circumferential continuous structure of film 28, film 28 includes concave portions 51 that engage the outer surfaces of each buffer tube 20 at each axial cross-sectional position. This structure is in contrast to a helically wound binder that engages a buffer tube tangentially and that engages discreet portions of less than all of the buffer tubes at each axial position along at least a portion of the length of cable 40.

As noted above, film 28 cools such that film 28 is in tension and applies a radially inwardly directed force onto buffer tubes 20. Thus, in various embodiments, film 28 is an elastic sleeve that surrounds core elements 48. In various embodiments, film 28 is a non-helical binder, and in such embodiments, the cables discussed herein do not include a helically wound binder located between core elements 48 and jacket 12. In such embodiments, the residual strain within film 28 following cooling is proportional to the radial force applied to buffer tubes 20. In various embodiments, because film 28 is extruded over buffer tubes 20 and cools to apply the binding force, film 28 includes low or no torsional stress and/or low or no stress in the circumferential direction. Thus, in contrast to a helically wound binder that may include both torsional stress and/or stress in the circumferential direction, film 28 may provide radial forces coupling core elements 48 to central strength member 24 without significant torsional or circumferential stress. In some embodiments, film 28 may be a non-extruded elastic sleeve imparting binding force to core elements 48 as discussed herein.

Because film 28 is continuous both circumferentially and axially along at least a portion of the axial length of core 26, at each axial cross-sectional position within film 28, the radially inwardly directed force applied by film 28 is evenly distributed circumferentially around core 26. In addition, in this arrangement, at each axial cross-section position within film 28, the coupling normal force experienced by central strength member 24 transmitted from film 28 through buffer tubes 20 is substantially evenly distributed around central strength member 24. In contrast, the coupling normal force experienced by the central strength member within in a cable using a helical binder is distributed substantially following the helical path of the binder, and thus is not evenly distributed circumferentially around the central strength member at a given axial position.

The embodiment of cable 40 shown in FIG. 3, includes six optical fiber transmission elements, shown as core elements 48, each including a buffer tube 20 and optical fibers 18. As shown the six core elements 48 are evenly spaced around central strength member 24. As discussed above, FIG. 2 shows film 28 in substantially continuous engagement with outer surfaces of the elements of core 26 in the axial direction. In addition to the axial contact, as shown in FIG. 3, film 28 is also in contact with the radial outermost surfaces of each of the core elements 48 in the circumferential direction around core elements 48. It is through both the axial contact and the circumferential contact that film 28 acts to apply a radially inward direct force that is substantially continuous in the axial and circumferential directions to maintain core 26 in the stranding pattern as discussed above.

As will be understood, the outer width between opposing sections of outer surfaces of film 28 (e.g., the cross-sectional dimension of film 28 passing through the center of bore 16) and the inner width between opposing sections of the inner surface of film 28 (e.g., the cross-sectional dimension of film 28 passing through the center of bore 16) are sized such that film 28 surrounds core elements 48 while also providing sufficient strength and tension to provide the radially inward directed force discussed above. In various embodiments, film 28 has an average outer width of between 1 mm and 10 mm.

In various embodiments, cable 40 and/or cable 10 may include various additional cable components. As shown in FIG. 1, cable 10 may include one or more rip cord 42 located between core 26 and film 28. Rip cord 42 facilitates opening of cable jacket 12 and access to the optical fibers of cable 10, and because rip cord 42 is between core 26 and film 28 it also facilitates opening of film 28. In various embodiments, the material of film 28 may be configured to not significantly bond with the material of buffer tubes 20 allowing rip cord 42 to facilitate separation of both cable jacket 12 and film 28 from buffer tubes 20. In one such embodiment, film 28 is formed from a polyethylene material, and buffer tubes 20 are formed from a material such as polypropylene or polycarbonate that does not substantially bond to the polyethylene of film 28

Referring to FIG. 4, cable 40 may also include one or more additional elongate elements shown as elements 44 and 46. As shown in FIG. 3, elements 44 are located within bore 16 and element 46 is shown embedded in jacket 12. In one embodiment, elements 44 and 46 are elongate strength elements, and in another embodiment, elements 44 and 46 are water blocking yarns. In various embodiments, jacket 12 includes one or more co-extruded discontinuities (e.g., extruded regions of polypropylene) that extend axial through the jacket, and in such embodiments, the discontinuity facilitates opening of jacket 12 by tearing. In one such embodiment, film 28 may be bonded to jacket 12 acting to buttress the jacket limiting the chance of accidental opening or splitting along the discontinuity. In such embodiments, film 28 may act to limit crack propagation through the material of jacket 12.

Referring to FIG. 4, a detailed view of one of the optical transmission core elements 48 is shown according to an exemplary embodiment. As shown, each core element includes optical fibers 18 located within a bore 50 defined by inner surface 52 of buffer tube 20. Buffer tube 20 also includes an outer surface 54 that is in contact with film 28 as discussed above. In the embodiment shown, each core element includes twelve optical fibers 18, and in this arrangement three of the twelve optical fibers are located in a central area of bore 50, and nine of the twelve are located around the inner three fibers and at least some of the outer nine fibers have outer surfaces 56 that engage inner surface 52 of buffer tube 20. In various embodiments, core element 48 includes at least nine optical fibers 18 located within buffer tube 20. In other embodiments, core element 48 of cable 40 includes 2, 4, 6, 8, 12, 24, 36 or more optical fibers 18.

In the embodiment shown in FIG. 4, the inner diameter of buffer tube 20, shown as ID1, is selected to provide densely packed optical fibers 18 within buffer tube 20. In various embodiments, ID1 is between 0.5 mm and 3.0 mm. In other embodiments, ID1 is between 0.8 mm and 2.0 mm. In various embodiments, there is zero clearance between inner surface 52 of buffer tube 20 and the radially outer most surfaces of at least some fibers 18 within tube 20. Because of the dense packing of fibers 18 within buffer tubes 20 and because of the resulting contact between fiber outer surfaces 56 and inner surface 52 of buffer tube 20, the fibers 18 may tend to experience forces applied to outer surface 54 of buffer tube 20 which may in turn result in attenuation of the optical signal within fibers 18. Thus, in one embodiment, use of a binding membrane, such as film 28, in place of a typical helical tape or yarn binder, will tend to evenly distribute the binding forces both axially and circumferentially which may limit strain-based attenuation experienced by a signal with the optical fibers.

In addition, in various embodiments, fibers 18 extend between first and second opposing ends of the respective buffer tube, and in some such embodiments, the length of each fiber 18 is substantially the same length as buffer tube 20. In these embodiments, the optical transmission element has zero or near zero excess fiber length (EFL) within the tube. In some such embodiments, the core element 48 may be referred to as a mircomodule that has a cross-sectional diameter less than the diameter of a buffer tube of loose tube cable. In other embodiments, core element 48 may be a buffer tube of loose tube cable, and in such embodiments, may have an EFL greater than zero.

Figure 5:
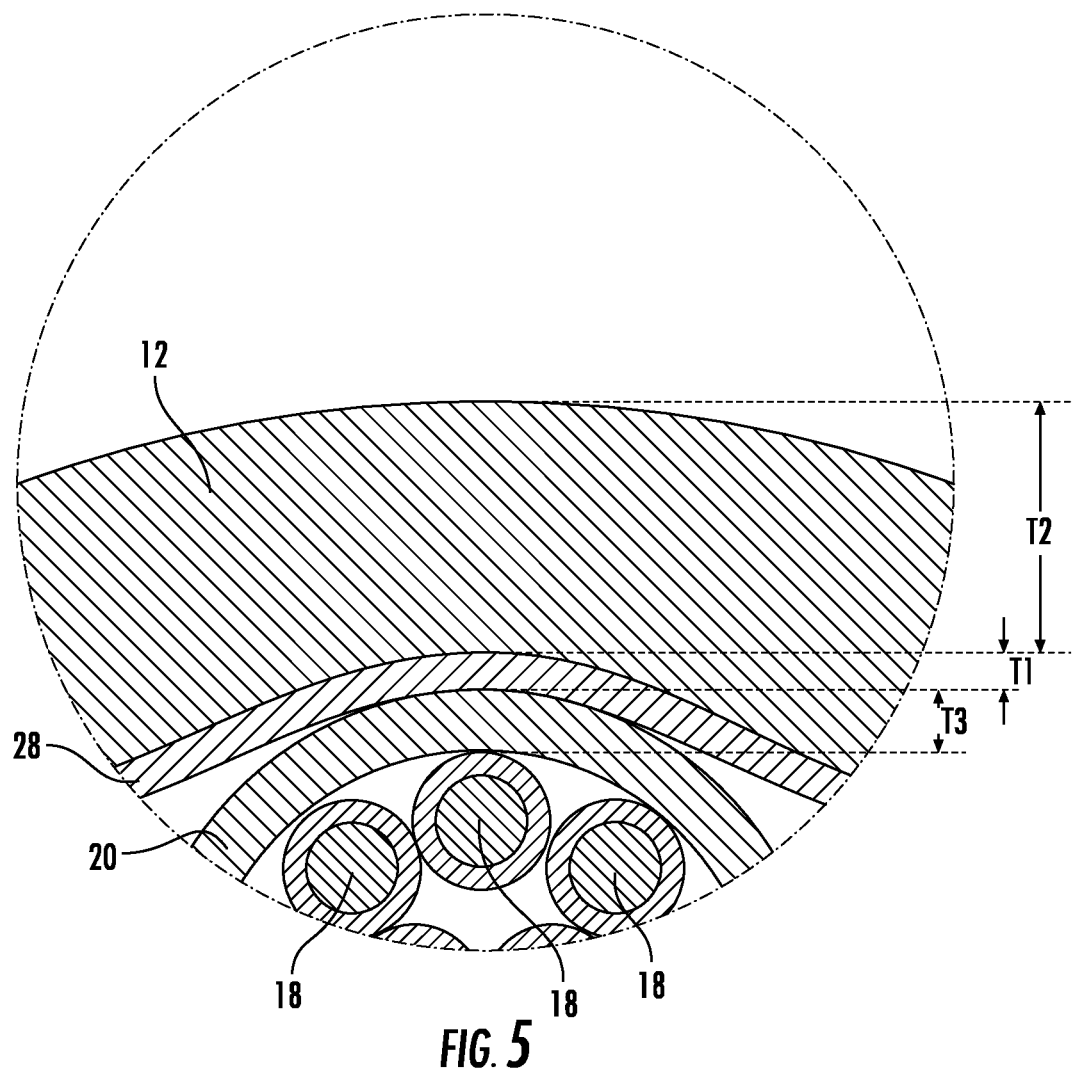
FIG. 5 is a detailed sectional view of a portion of a core element, film and jacket of the cable of FIG. 3 according to another exemplary embodiment.

Referring to FIG. 5, a detailed view of film 28 and jacket 12 are shown according to an exemplary embodiment. As shown in FIG. 5, film 28 has a radial dimension or thickness shown as T1, and jacket 12 has a radial dimension or thickness shown as T2. In various embodiments, T1 is less than 100 micrometers, and T2 is greater than 1 millimeter. In various embodiments, T1 is between 25 micrometers and 75 micrometers and more specifically is about 50 micrometers. In various embodiments, T2 is between 1 millimeter and 5 millimeters, specifically is between 1 millimeter and 3 millimeters and more specifically is between 1.2 millimeters and 1.4 millimeters. In one embodiment, jacket 12 is less than 5 millimeters. In one embodiment, jacket 12 is a thin jacket, and T2 is less than or equal to 0.2 mm. In various embodiments, T1 is between 0.5% and 10% of T2, specifically T1 is between 1.5% and 6.5% of T2, and more specifically T1 is between 3.5% and 4.5% of T2.

In various embodiments, the outer diameter of jacket 12 of cable 10 is between 4 millimeters and 10 millimeters, specifically is between 5 millimeters and 6 millimeters, and more specifically is about 5.4 millimeters (e.g., 5.4 millimeters plus or minus 0.1 millimeter).

Buffer tube 20 has a radial dimension or thickness shown as T3. T3 may vary based upon the number of fibers 18 located within tube 20. In various embodiments, T3 is between 0.2 millimeters and 0.7 millimeters, specifically is between 0.3 millimeters and 0.6 millimeters and more specifically is between 0.4 millimeters and 0.5 millimeters. In a specific embodiment, T3 is about 0.32 millimeters (e.g., 0.32 mm plus or minus 0.01 millimeters), and in another embodiment, T3 is about 0.36 millimeters (e.g., 0.36 mm plus or minus 0.01 millimeters). In various embodiments, buffer tubes 20 are formed from one or more polymer material including polypropylene (PP), polybutylene terephthalate (PBT), polycarbonate (PC), polyamide (PA), polyoxymethylene (POM), poly(ethene-co-tetrafluoroethene) (ETFE), etc.

In various embodiments, core elements 48 can include a wide variety of optical fibers including multi-mode fibers, single mode fibers, bend insensitive fibers, etc. In one embodiment, core elements 48 are micromodules of densely packed fibers within a tube. In other embodiments, core elements 48 are buffer tubes of a loose tube cable. In another embodiment, core elements 48 are tight buffered optical fibers.

Figure 6:
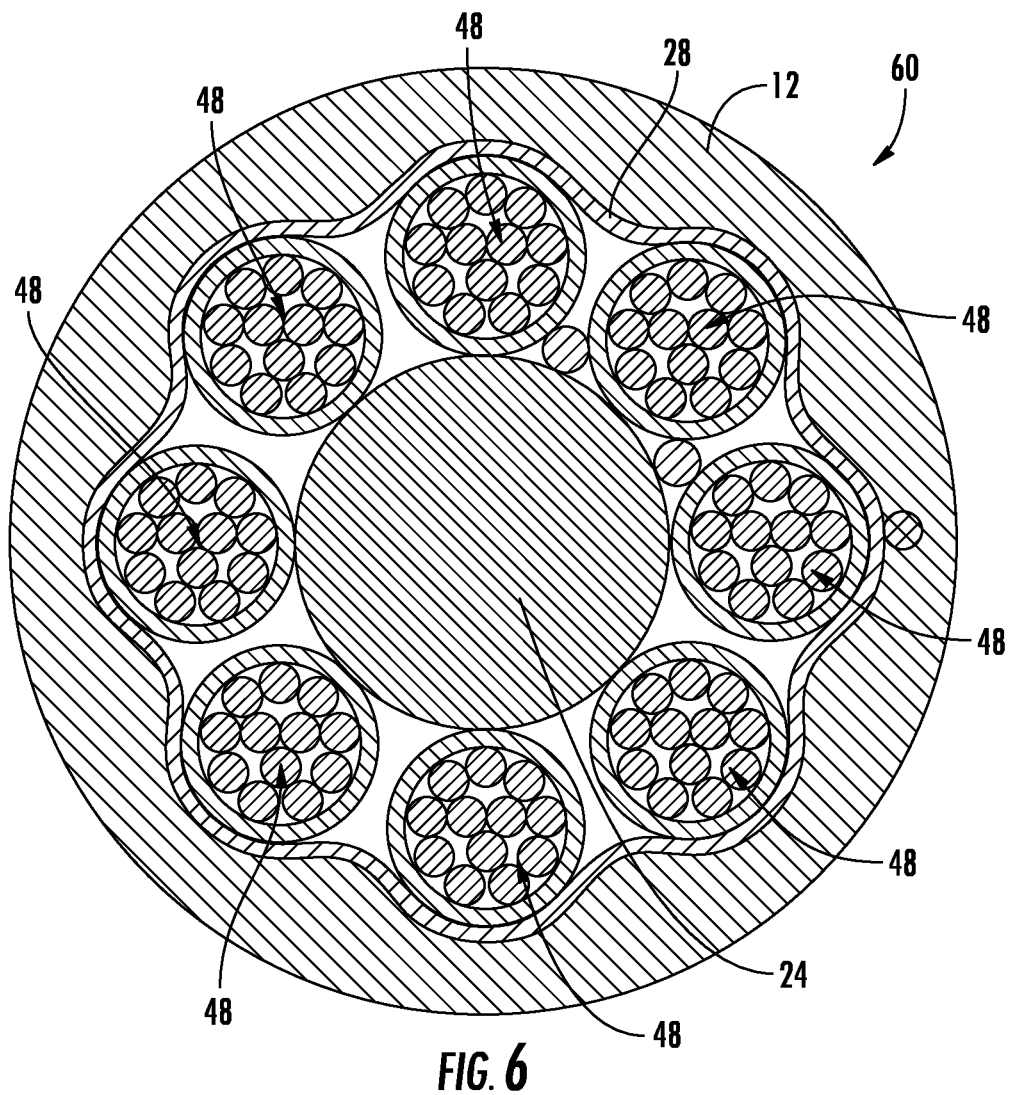
FIG. 6 is a cross-sectional view of a cable according to another exemplary embodiment.
Figure 7:
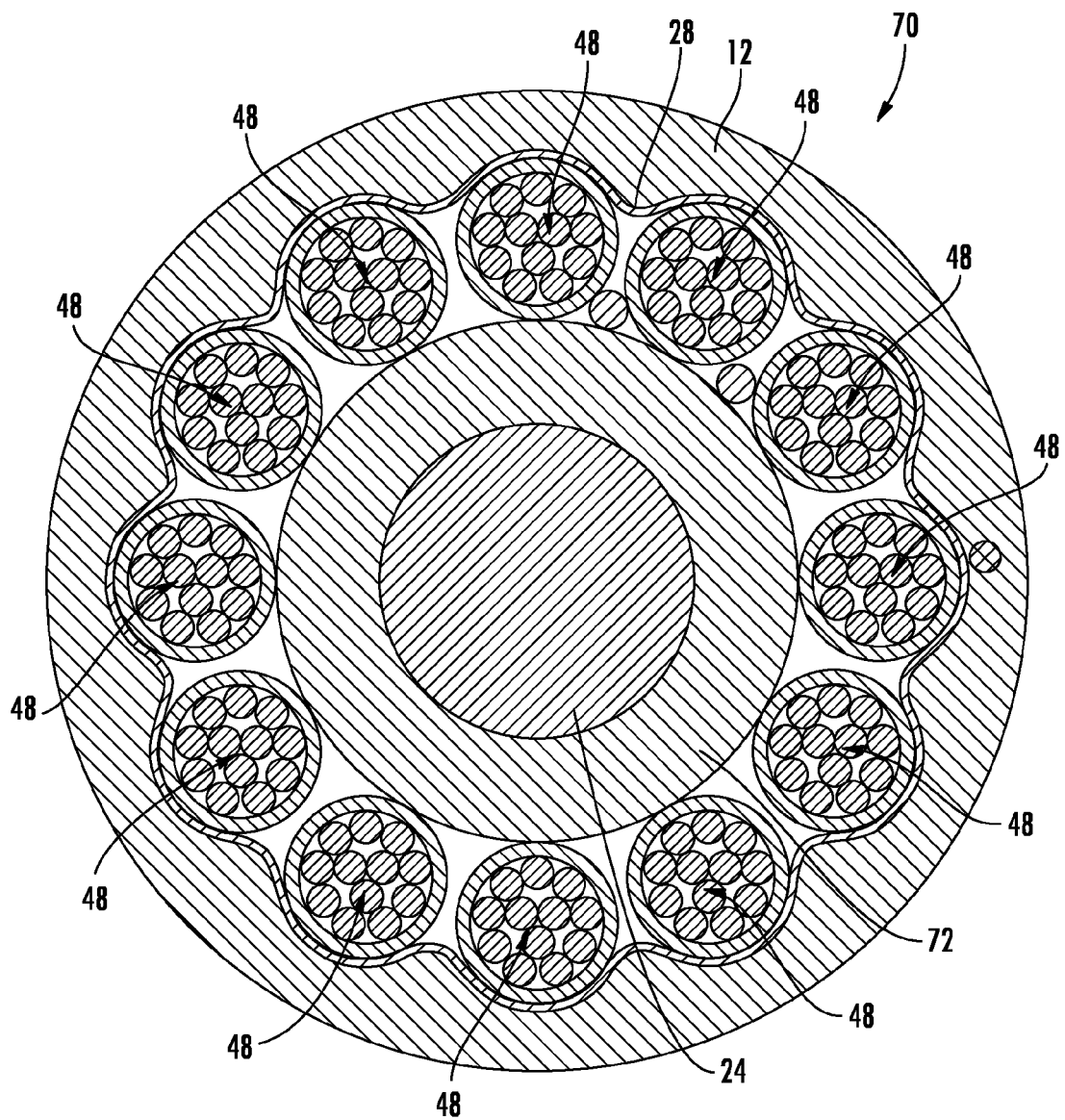
FIG. 7 is a cross-sectional view of a cable according to another exemplary embodiment.

Referring to FIGS. 6 and 7, different sized optical fiber cables are shown according to exemplary embodiments. As shown in FIG. 6, cable 60 is substantially similar to cable 10 discussed above, except cable 60 includes eight core elements 48. In various embodiments, the outer diameter of jacket 12 of cable 60 is between 6 millimeters and 7 millimeters, and more specifically is about 6.4 millimeters (e.g., 6.4 millimeters plus or minus 0.1 millimeter). As shown in FIG. 7, cable 70 is substantially similar to cable 10 discussed above, except cable 70 includes twelve core elements 48. In various embodiments, the outer diameter of jacket 12 of cable 70 is between 8 millimeters and 9 millimeters, and more specifically is about 8.2 millimeters (e.g., 8.2 millimeters plus or minus 0.1 millimeter). In addition, central strength member 24 of cable 70 includes an outer coating layer 72. In other embodiments, cables discussed herein may include 2, 4, 10, 14, 16, 20, 24, 32, etc. core elements 48.

Referring to FIG. 8, a schematic view of a process and system 100 for forming an SZ stranded core element surrounded by a binding film or membrane, such as film 28, is shown according to an exemplary embodiment. An oscillating nose piece 102 wraps core elements 48 around a central strength member in a spiral pattern, such as SZ stranding pattern 104. Nose piece 102 is located within an extruded film cone 106 that is formed as the material to form film 28 exits from the extruder. The extruded film material 106 is drawn down to closely adhere to core 26.

As the film material 106 engages core 26, a constraining device, shown as caterpuller 110, engages the film coated core 26. Generally, caterpuller 110 engages core 26 to provide physical support to the wound core elements 48 while the material of extruded film 28 cools and solidifies. In other words, caterpuller 110 holds core elements 48 in place in the desired stranding pattern while film 28 cools and solidifies, and once film 28 is solidified, the tension within film 28 generates radial inwardly directed forces that hold core elements 48 in place in the desired stranding pattern. Caterpullers 110 also impart movement to film coated core 26 in the direction of arrow 114 to move film coated core 26 to receive other cable components including cable jacket 12 at subsequent stations in the cable assembly process. In other embodiments, system 100 may include other constraining devices, for example capstans may be used in place of caterpuller 110.

Referring to FIG. 8, system 100 is configured to accelerate the cooling of film 28 by providing an active cooling element that removes heat from the extruded material that forms film 28. In the embodiment shown system 100 is configured to direct a cooling fluid, shown as cooling fluid 116 (e.g., air, water, other coolant, etc.), on to the extruded material that forms film 28. Fluid 116 helps remove heat from film 28 accelerating the solidification process.

In various embodiments, system 100 is configured to apply SAP particles or powder 118 into the region between film 28 and core 26. In this embodiment, SAP 118 is applied to the interior of extruded film cone 106, and may be driven by a vacuum applied to the interior of extruded film cone 106. In such embodiments, SAP 118 is driven into the interstices between elements 48 within bore 16. In addition, SAP particles are embedded into the molten material of extruded film cone 106. Thus, upon solidification, film 28 is formed with embedded water blocking particles along its interior surface. In some embodiments, embedded water blocking particles are also applied to the outer surface of film 28. Thus, in such embodiments, film 28 also acts as the water blocking agent eliminating the need to add separate water blocking layers, for some cable applications.

As discussed above, as film 28 cools, film 28 contracts applying a radial inwardly directed force that is evenly distributed around core 26. Thus, film 28 acts to hold core 26 in the desired wrapped pattern while other components of the cable are added. In various embodiments, because film 28 is extruded around core 26 (as opposed to being helically wrapped) and is cooled such that the tension within film 28 acts to apply the inward binding force, film 28 does not apply significant torsional forces to core 26.

In addition to utilizing caterpuller 110 to hold core 26 in place prior to solidification of film 28, system 100 may be configured to apply an adhesive to core 26. In one such embodiment, a hot melt adhesive is applied to core 26 adjacent to nose piece 102.

In various embodiments, system 100 may be configured to perform a method of forming an optical cable. In one such embodiment, the method includes wrapping a plurality of elongate optical transmission elements around an elongate central support member. The method also includes extruding a film formed around the plurality of wrapped elongate optical transmission elements such that an inner surface of the film is in contact with an outer surface of each of the plurality of elongate optical transmission elements. The method includes cooling the film such that the film solidifies applying a radially inwardly directed force to the plurality of elongate optical transmission elements. The method also includes extruding a cable body around the film following cooling of the film. In various embodiments, discussed above the film and jacket may be formed from the same type of material or different types of material. In various embodiments of the method, the inner surface of the film first contacts the outer surface of each of the plurality of elongate optical transmission elements within a distance of 100 mm from the point at which the elongate optical transmission elements are wrapped around an elongate central support member. In various embodiments of the method, the first material is a low density polyethylene material and the second material a medium density polyethylene material. In various embodiments, the method includes engaging an outer surface of the film after extruding the film and prior to solidification of the film. In one such embodiment, the engaging is performed by an advancing device, such as caterpuller 110.

In various embodiments, cable jacket 12 may be a variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

In various embodiments, the cable embodiments discussed herein may include one or more electrical conductive element located within bore 16. In various embodiments, the conductive element may be a copper conductive element having a diameter of 12 AWG, 14 AWG, 16 AWG, 18 AWG, 20 AWG, 22 AWG, 24 AWG, or smaller.

As noted above, the radially directed inwardly directed force applied by film 28 helps restrain and hold the wound core elements 48 in place during subsequent manufacturing process and also limits axially sliding that may occur between core elements and the strength element. Via pull-through testing, Applicants have found that the magnitude of the static friction force is related to the thickness of the film 28. For a polypropylene film 28 of at least 0.02 mm but less than 0.04 mm in average wall thickness, the static friction force for a 100 mm section of core elements 48 (without a jacket) is at least 10 N, such as about 12.4 N, and/or the average static friction force for a 200 mm section of core elements 48 is at least 20 N, such as about 23.1 N. Accordingly, in such embodiments, the net spring force of the core elements 48 within the reverse-oscillatory stranding pattern is about 10 N or less for a 100 mm section to prevent or limit axial migration of the core elements 48. Applicants have also found, for a polypropylene film 28 of at least 0.08 mm but less than 0.15 mm in average wall thickness, the average static friction force for a 100 mm section of stranded elements is at least 20 N, such as at least 30 N, and/or the average static friction force for a 200 mm section of stranded elements is at least 40 N, such as at least 50 N. Some testing included core elements bound by both film 28 and binders yarns to determine the contribution of the film 28.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12 and/or buffer tubes 20 may have an oval, elliptical, square, rectangular, triangular or other cross-sectional shape. In such embodiments, the passage or lumen of the cable or buffer tube may be the same shape or different shape than the shape of cable jacket 12 or buffer tube. In some embodiments, cable jacket 12 and/or buffer tube may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

In some embodiments, as disclosed above, the binding element (e.g., sleeve, film, membrane) and/or the jacket of the respective cable may include, such as primarily include or is formed from, polyethylene. In some such embodiments, the polyethylene may be high-density polyethylene having a density about 0.93 to 0.97 $g/cm^3$. In some embodiments, the buffer tubes include polycarbonate, as discussed above, and may further include an exterior and/or interior layer of another polymer, such as polybutylene terephthalate or polypropylene, which may serve to limit or mitigate crack initiation or propagation through the polycarbonate.

The following are specific examples of cables as disclosed herein.

Example 1

One embodiment includes a cable having six tubes positioned around a glass-reinforced plastic strength member. The strength member may have a diameter of about 1.5 mm. The tubes may be polypropylene or a composite of a polycarbonate inner layer with polybutylene terephthalate outer layer. The tubes may have an outer diameter of 1.4 mm, 1.3 mm, or 1.1 mm. The tubes may each include twelve optical fibers. Additionally, the cable includes two water-blocking yarns wrapped around the strength member, such about 1100 dtex in fineness of the yarn. The cable includes a stranding lay length or pitch length, as discussed above, in the range of between about 56 to 60 mm. Further, the core includes a binding element, as disclosed herein, and possibly includes one or more ripcords to remove the binding element and/or the jacket. The core has an outer diameter of about 4.4 mm. The jacket is formed from high-density polyethylene, has a thickness of about 0.5 mm, and may be colored black. The resulting outer diameter of the cable is about 5.3 mm Example 2

Another embodiment includes a cable having eight tubes positioned around a glass-reinforced plastic strength member. The strength member may have a diameter of about 2.5 mm. The tubes may be polypropylene or a composite of a polycarbonate inner layer with polybutylene terephthalate outer layer. The tubes may have an outer diameter of 1.4 mm, 1.3 mm, or 1.1 mm. The tubes may each include twelve optical fibers. Additionally, the cable includes two water-blocking yarns wrapped around the strength member, such about 1100 dtex in fineness of the yarn. The cable includes a stranding lay length or pitch length, as discussed above, in the range of between about 66 to 70 mm. Further, the core includes a binding element, as disclosed herein, and possibly includes one or more ripcords to remove the binding element and/or the jacket. The core has an outer diameter of about 5.4 mm. The jacket is formed from high-density polyethylene, has a thickness of about 0.5 mm, and may be colored black. The resulting outer diameter of the cable is about 6.3 mm Example 3

Another embodiment includes a cable having twelve tubes positioned around a glass-reinforced plastic strength member. The strength member may have a diameter of about 2.5 mm or 4.3 mm. The tubes may be polypropylene or a composite of a polycarbonate inner layer with polybutylene terephthalate outer layer. The tubes may have an outer diameter of 1.4 mm, 1.3 mm, or 1.1 mm. The tubes may each include twelve optical fibers. Additionally, the cable includes two water-blocking yarns wrapped around the strength member, such about 1100 dtex in fineness of the yarn. The cable includes a stranding lay length or pitch length, as discussed above, in the range of between about 80 to 84 mm. Further, the core includes a binding element, as disclosed herein, and possibly includes one or more ripcords to remove the binding element and/or the jacket. The core has an outer diameter of about 7.2 mm. The jacket is formed from high-density polyethylene, has a thickness of about 0.5 mm, and may be colored black. The resulting outer diameter of the cable is about 8.1 mm.

In contemplated embodiments, cables similar to the above described examples and other embodiments disclosed herein, may include at least four tubes carrying optical fibers and/or no more than twenty tubes, such as at least six and/or no more than eighteen tubes. In contemplated embodiments, the central strength member of any one of the above examples may include steel or even stranded stainless steel, such as a steel rod up jacketed with polyethylene insulator. In contemplated embodiments, the central strength member is at least about 1.25 mm in diameter and/or no more than about 5 mm in diameter. In some contemplated embodiments, even smaller tubes are used than those described in the examples, such as tubes having an outer diameter of about 1 mm or less, where the tubes may still include twelve optical fibers, but the optical fibers may have smaller diameters than typical optical fibers, such as diameters as small as 210 micrometers or less, such as about 200 micrometers in diameter. In some embodiments, 1 mm tubes or other size tubes as disclosed herein may include fewer optical fibers than twelve, such as 8 or less optical fibers, or 4 or less optical fibers. In other contemplated embodiments, larger tubes may be used, such as tubes that are greater than 1.4 mm in diameter and less than about 2 mm in diameter, where such tubes may carry more than twelve optical fibers and/or no more than a hundred optical fibers, such as twenty-four optical fibers of about 200 micrometers in diameter within a 1.7 mm tube. In some contemplated embodiments, the cables may not include water-blocking yarn, or may use other sizes or numbers of water-blocking yarn. In some contemplated embodiments, the lay or pitch length of the stranding is at least about 50 mm and/or no more than about 100 mm. In contemplated embodiments, such as those similar to the above examples and embodiments disclosed above, the core has an outer diameter that is at least about 3 mm and/or no more than about 10 mm, such as at least about 4 mm and/or no more than about 9 mm. In contemplated embodiments, the wall thickness of the jacket is at least 0.3 mm and/or no more than 0.8 mm. The material of the jacket may be any type of polyethylene, or may be a flame-retardant material, such as filled polyvinyl chloride or a low-smoke-zero-halogen material. The jacket may be orange, green, or otherwise colored. The resulting outer diameter of contemplated cables disclosed herein is at least 4 mm and/or no greater than about 12 mm, such as at least about 5 mm and/or no greater than about 10 mm. The above disclosure may allow for a particular narrow minicable, able to be routed in small ducts and consuming little space.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:
a cable body including a passage within the cable body;
a first core element located in the passage of the cable body, the first core element including an outer surface and a first optical transmission element;
a second core element located in the passage of the cable body, the second core element including an outer surface and a second optical transmission element;
a strength member located in the passage of the cable body, wherein the first core element and the second core element are wound around the strength member; and
a film formed from a first polyethylene material located within the passage of the cable body, the film surrounding the first core element, the second core element and the strength member, wherein the film applies a radial inwardly directed force to the outer surface of the first core element and the outer surface of the second core element;
wherein the cable body is formed from a second polyethylene material different from the first polyethylene material, the cable body surrounding the film, the cable body having an inner surface that faces the outer surface of the film, wherein the outer surface of the film and the inner surface of the cable body contact one another at an interface therebetween where the first and second polyethylene materials are bonded to one another, facilitating simultaneous opening or removal of the cable body and film together.

2. The optical communication cable of claim 1 wherein the radially inwardly directed force is evenly distributed around the first core element and the second core element at a first axial position along the cable body.

3. The optical communication cable of claim 1 wherein the first core element includes a first tube having an inner surface defining a bore, wherein the first optical transmission element is located within the bore of the first tube, wherein the second core element includes a second tube having an inner surface defining a bore, wherein the second optical transmission element is located within the bore of the second tube, wherein the diameter of the bore of the first tube is between 0.5 mm and 3.0 mm, wherein the diameter of the bore of the second tube is between 0.5 mm and 3.0 mm, wherein the inner surface of the first tube is in contact with a portion of an outer surface of the first optical transmission element, wherein the inner surface of the second tube is in contact with a portion of an outer surface of the second optical transmission element.

4. The optical communication cable of claim 3 wherein the first optical transmission element includes at least nine optical fibers and the second optical transmission element includes at least nine optical fibers, wherein an inner surface of the film contacts the outer surface of the first core element and the outer surface of the second core element.

5. The optical communication cable of claim 4 wherein the film has a thickness that is less 100 micrometers, and the cable body has a thickness greater than 1 millimeter, wherein an outer diameter of the cable body is between 4 millimeters and 10 millimeters.

6. The optical communication cable of claim 1 wherein the first core element and the second core element are wrapped around the strength member such that the wrapped first and second core elements include a plurality of left-handed spirally wrapped sections, a plurality of right-handed spirally wrapped sections and a plurality of reversal sections providing transitions between the left-handed spirally wrapped sections and the right-handed spirally wrapped sections.

7. The optical communication cable of claim 6 wherein each left-handed spirally wrapped section includes less than 10 revolutions and more than one half revolution between reversals and each right-handed spirally wrapped section includes less than 10 revolutions and more than one half revolution between reversals, wherein the cable does not include a helically wrapped binder element located between the first and second core elements and the cable body.

8. The optical communication cable of claim 7 wherein the inner surface of the film is in substantially continuous contact with the outer surface of the first core element and the outer surface of the second core element extending axially over at least one left-handed spirally wrapped section, at least one right-handed spirally wrapped section, and at least one reversal.

9. An optical communication cable comprising:
a cable body including a bore within the cable body;
an elongate central strength member located in a central area of the bore;
a plurality of elongate optical transmission elements wrapped around the elongate central strength member such that a portion of a length of the plurality of wrapped elongate optical transmission elements forms a spiral portion around the elongate central strength member; and an extruded membrane surrounding the plurality of elongate optical transmission elements, the extruded membrane formed from a first material, wherein the extruded membrane is contiguous in a circumferential direction around the elongate optical transmission elements and is contiguous in an axial direction for at least one revolution of the elongate optical transmission elements around the elongate central strength member within the spiral portion, wherein the membrane contacts an outer surface of each of the plurality of elongate optical transmission elements within the spiral portion;

wherein the membrane forms an undulating pattern in cross-section, which includes interspaced convex portions and concave portions as the extruded membrane contacts and extends between each of the plurality of elongate optical transmission elements within the spiral portion, and wherein the membrane applies a radial inwardly directed force to the outer surface of the plurality of elongate optical transmission elements, limiting the elongate optical transmission elements from unwinding from around the elongate central strength member;

wherein the cable body is formed from an extruded second material, the cable body surrounding the membrane, the cable body having an inner surface that faces the outer surface of the membrane.

10. The optical communication cable of claim 9 wherein the extruded membrane has a thickness less than 100 micrometers.

11. The optical communication cable of claim 9 wherein at least one of the optical transmission elements is a tight buffered optical fiber.

12. The optical communication cable of claim 9 wherein the spiral portion includes at least five adjacent revolutions in the right-hand direction, wherein the membrane applies a radial inwardly directed force to the outer surface of each of the plurality of elongate optical transmission elements extending over at least five adjacent revolutions of the spiral portion.

13. The optical communication cable of claim 9 wherein the plurality of optical transmission elements are wrapped around the elongate central strength member such that the plurality of optical transmission elements include a plurality of left-handed spirally wrapped sections, a plurality of right-handed spirally wrapped sections and a plurality of reversal sections providing transitions between the left-handed spirally wrapped sections and the right-handed spirally wrapped sections.

14. The optical communication cable of claim 13 wherein each left-handed spirally wrapped section includes less than 10 revolutions and more than one half revolution between reversals and each right-handed spirally wrapped section includes less than 10 revolutions and more than one half revolution.

15. The optical communication cable of claim 14 wherein an inner surface of the membrane is in substantially continuous contact with the outer surface of each of the plurality of elongate optical transmission elements extending over one of the left-handed spirally wrapped sections, one of the right-handed spirally wrapped sections and the reversal section located between the left-handed spirally wrapped section and the right-handed spirally wrapped section.

16. The optical communication cable of claim 1, wherein the first polyethylene material of the film is a lower density polyethylene material than the second polyethylene material of the body.

17. The optical communication cable of claim 16, wherein the second polyethylene material of the body has a high density, in the range of 0.93 to 0.97 g/cm$^3$.

18. The optical communication cable of claim 1, wherein the body comprises a discontinuity that extends axially through the body, whereby the discontinuity facilitates opening of body by tearing, and wherein the film is bonded to body such that the film buttresses the body, thereby limiting chances of accidental opening or splitting along the discontinuity.

19. The optical communication cable of claim 1, wherein the cable body is thicker than the film.

20. The optical communication cable of claim 9, wherein the body comprises a discontinuity that extends axially through the body, whereby the discontinuity facilitates opening of body by tearing, and wherein the membrane is bonded to body such that the membrane buttresses the body, thereby limiting chances of accidental opening or splitting along the discontinuity.

21. The optical communication cable of claim 9, wherein the cable body is thicker than the membrane.

22. An optical communication cable, comprising:
a cable jacket having an inner surface that defines a cavity, wherein the optical communication cable has an outer diameter of no greater than 12 millimeters;
a central strength member located in a central area of the cavity;
buffer tubes wrapped around the central strength member in an SZ stranding pattern, wherein the buffer tubes each have an inner diameter of between 0.5 and 3.0 millimeters, wherein the buffer tubes carry optical fibers, wherein the optical fibers in the buffer tubes have EFL of about 0.1% or less per optical fiber on average; and
a thin film binder surrounding the buffer tubes, the thin film binder formed from a first polymer,
wherein the thin film binder is contiguous in a circumferential direction around the buffer tubes and is contiguous in an axial direction for at least one revolution of the buffer tubes around the central strength member within the SZ stranding pattern,
wherein the thin film binder forms an undulating pattern in cross-section, which includes interspaced convex portions and concave portions as the thin film binder contacts and extends between individual ones of the buffer tubes, and wherein the thin film binder applies a radial inwardly directed force to the outer surface of the buffer tubes, limiting the buffer tubes from unwinding from around the central strength member;
wherein the cable jacket is formed from a second polymer, the cable jacket surrounding the thin film binder, the cable jacket having an inner surface that faces the outer surface of the thin film binder.

23. The optical communication cable of claim 22, wherein the optical communication cable has an outer diameter of at least 4 millimeters.

24. The optical communication cable of claim 22, wherein the optical communication cable is a minicable with the central strength member having a diameter of no more than about 5 millimeters.

25. The optical communication cable of claim 22, wherein at least some of the optical fibers have diameters of 210 micrometers or less.

26. The optical communication cable of claim 22, wherein the cable jacket is thicker than the thin film binder, and wherein the wall thickness of the jacket is at least 0.3 millimeters.

27. An optical communication cable comprising:
a cable jacket having an inner surface that defines a cavity, wherein the optical communication cable has an outer diameter of no greater than 12 millimeters;
a first buffer tube located in the cavity of the cable jacket, the first buffer tube including an outer surface, wherein the first buffer tube has an inner diameter of between 0.5 and 3.0 millimeters, wherein the first buffer tube carries optical fibers, wherein the optical fibers in the first buffer tube have EFL of about 0.1% or less per optical fiber on average;
a second buffer tube located in the cavity of the cable jacket, the second buffer tube including an outer surface, wherein the second buffer tube has an inner diameter of between 0.5 and 3.0 millimeters, wherein the second buffer tube carries optical fibers, wherein the optical fibers in the second buffer tube have EFL of about 0.1% or less per optical fiber on average;
a central strength member located in the cavity of the cable jacket, wherein the first and second buffer tubes are wound around the central strength member, wherein the first and second buffer tubes are wrapped around the central strength member in an SZ stranding pattern; and
a thin film binder formed from a first polyethylene material located within the cavity of the cable jacket, the thin film binder surrounding the first buffer tube, the second buffer tube and the central strength member, wherein the thin film binder applies a radial inwardly directed force to the outer surfaces of the first and second buffer tubes;
wherein the cable body is thicker than the film;
wherein the cable jacket is formed from a second polyethylene material different from the first polyethylene material, the cable jacket surrounding the thin film binder, the cable jacket having an inner surface that faces an outer surface of the thin film binder, wherein the outer surface of the thin film binder and the inner surface of the cable jacket contact one another at an interface therebetween where the first and second polyethylene materials are bonded to one another, facilitating simultaneous opening or removal of the cable jacket and thin film binder together.

28. The optical communication cable of claim 27, wherein the first polyethylene material of the film is a lower density polyethylene material than the second polyethylene material of the body.

29. The optical communication cable of claim 28, wherein the second polyethylene material of the body has a high density, in the range of 0.93 to 0.97 g/cm$^3$.

30. The optical communication cable of claim 27, wherein the body comprises a discontinuity that extends axially through the body, whereby the discontinuity facilitates opening of body by tearing, and wherein the film is bonded to body such that the film buttresses the body, thereby limiting chances of accidental opening or splitting along the discontinuity.

* * * * *